United States Patent
Naito et al.

(10) Patent No.: US 7,361,202 B2
(45) Date of Patent: *Apr. 22, 2008

(54) TANTALUM SINTERED BODY AND CAPACITOR USING THE SINTERED BODY

(75) Inventors: Kazumi Naito, Chiba (JP); Isao Kabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 473 days.

This patent is subject to a terminal disclaimer.

(21) Appl. No.: 10/250,669

(22) PCT Filed: Sep. 30, 2002

(86) PCT No.: PCT/JP02/10151

§ 371 (c)(1),
(2), (4) Date: Jul. 7, 2003

(87) PCT Pub. No.: WO03/032342

PCT Pub. Date: Apr. 17, 2003

(65) Prior Publication Data

US 2004/0052013 A1    Mar. 18, 2004

Related U.S. Application Data

(60) Provisional application No. 60/326,736, filed on Oct. 4, 2001.

(30) Foreign Application Priority Data

Oct. 1, 2001    (JP) .............................. 2001-305278

(51) Int. Cl.
*B22F 3/00* (2006.01)
*H01G 9/042* (2006.01)
*H01G 9/052* (2006.01)

(52) U.S. Cl. ........................................ 75/245; 361/529

(58) Field of Classification Search .................. 75/245; 361/529

See application file for complete search history.

(56) References Cited

U.S. PATENT DOCUMENTS

| 4,520,430 A | 5/1985 | Long et al. |
| 6,351,371 B1 * | 2/2002 | Yoshida et al. ............. 361/528 |
| 6,554,884 B1 * | 4/2003 | Tripp et al. .................... 75/252 |
| 6,696,138 B2 * | 2/2004 | Sakai et al. ................. 428/209 |
| 6,865,069 B2 | 3/2005 | Kabe et al. |
| 7,087,292 B2 | 8/2006 | Sakai et al. |
| 2003/0112577 A1 | 6/2003 | Kabe et al. |
| 2003/0183042 A1 * | 10/2003 | Oda et al. ...................... 75/245 |

FOREIGN PATENT DOCUMENTS

| EP | 1 045 410 A2 | 10/2000 |
| EP | 1 087 852 B1 | 9/2005 |
| JP | 59-143316 A | 8/1984 |
| WO | WO99/61184 A1 | 12/1999 |

OTHER PUBLICATIONS

Document D9—Experimental Report 2 (with English translation attached).*

* cited by examiner

*Primary Examiner*—Roy King
*Assistant Examiner*—Ngoclan T. Mai
(74) *Attorney, Agent, or Firm*—Sughrue Mion, PLLC

(57) ABSTRACT

A tantalum sintered body comprising a pore size distribution having a plurality of peaks wherein out of a plurality of peaks, two peaks having a largest relative intensity and a second largest relative intensity have a pore diameter of 0.2 to 0.7 μm and a pore diameter of 0.7 to 3 μm, having a volume of pore 10 mm$^3$ or more including the volume of pore voids and a specific area of 0.2 to 7 m$^2$/g, and having a CV value of 40,000 to 200,000 μFV/g when sintered at 1,300° C., and a capacitor using the sintered body.

35 Claims, No Drawings

TANTALUM SINTERED BODY AND CAPACITOR USING THE SINTERED BODY

CROSS-REFERENCE TO RELATED APPLICATION

This application is an application filed under U.S.C. § 111(a) claiming pursuant to 35 U.S.C. § 119(e) of the filing date of U.S. provisional application Ser. No. 60/326,736 on Oct. 4, 2001 pursuant to 35 U.S.C. § 111(b).

TECHNICAL FIELD

The present invention relates to a tantalum capacitor having a large capacitance appearance ratio and a tantalum sintered body for the capacitor.

BACKGROUND ART

Tantalum is a chemically stable metal and therefore used for various uses. For example, tantalum is widely used as a capacitor material for electronic instruments such as cellular phone and personal computer. The tantalum used as a capacitor material is usually in the powder shape and the powder particles are molded and then integrated by sintering to provide an electrode called a sintered body. The inside of the sintered body has a three-dimensional complicated form where the powder particles are electrically/mechanically connected. In the inside and outside of this sintered body, a dielectric film layer is formed and then a material working out to a counter electrode is impregnated, thereby fabricating a capacitor. Microscopically, the capacitance of the manufactured capacitor greatly depends on the contact state between the counter electrode material and the dielectric film layer insofar as the dielectric film layer is uniformly attached to the surface inside and outside the sintered body.

DISCLOSURE OF INVENTION

Assuming that the capacitance appearance ratio is 100% when an aqueous phosphoric acid solution is used as the counter electrode material and the contact state with the dielectric film layer is perfect, it has been difficult to achieve a capacitance appearance ratio of 100% by using an electrode material having a high viscosity, particularly, a solid electrode material. In particular, when the tantalum powder for capacitors has a small average particle size or when the sintered body obtained from the tantalum powder has a large shape, the difficulty increases and in an extreme case, the capacitance appearance does not reach even 50%. If the capacitance appearance ratio is low as such, the capacitor manufactured also suffers from insufficient moisture resistance in some cases.

As a result of extensive investigations to solve the above-described problems, the present inventors have found that when the sintered body used has a pore diameter distribution having a plurality of peaks, a high capacitance appearance ratio can be achieved and the capacitor manufactured using the powder can have a high moisture resistance value. The present invention has been accomplished based on this finding.

That is, the present invention relates to the following tantalum sintered body and a capacitor using the same.

(1) A tantalum sintered body comprising a pore size distribution having a plurality of peaks.

(2) The tantalum sintered body as described in 1 above, wherein out of a plurality of peaks, two peaks having a largest relative intensity and a second largest relative intensity have a pore diameter of 0.2 to 0.7 µm and a pore diameter of 0.7 to 3 µm.

(3) The tantalum sintered body as described in 1 above, wherein out of a plurality of peaks, the peak having a largest relative intensity has a pore diameter of 0.7 to 3 µm.

(4) The tantalum sintered body as described in any one of 1 to 3 above, wherein the sintered body has a volume of 10 mm³ or more including the volume of pore voids.

(5) The tantalum sintered body as described in any one of 1 to 4 above, wherein the sintered body has a specific area of 0.2 to 7 m²/g.

(6) The tantalum sintered body as described in any one of 1 to 5 above, wherein a part of the sintered body is nitrided.

(7) The tantalum sintered body as described in any one of 1 to 6 above, wherein the sintered body is obtained from a tantalum powder compact of giving a sintered body having a CV value of 40,000 to 200,000 µFV/g when sintered at 1,300° C.

(8) A capacitor comprising the sintered body described in any one of 1 to 7 above as an electrode, a dielectric material formed on the surface of the sintered body, and a counter electrode provided on the dielectric material.

(9) The capacitor as described in 8 above, wherein the dielectric material comprises a tantalum oxide as a main component.

(10) The capacitor as described in 9 above, wherein the tantalum oxide is formed by electrolytic oxidation.

(11) The capacitor as described in any one of 8 to 10 above, wherein the counter electrode is an electrically conducting polymer obtained by doping a dopant into a polymer containing a repeating unit represented by the following formula (1) or (2):

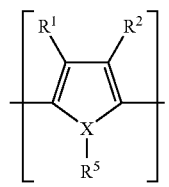

(1)

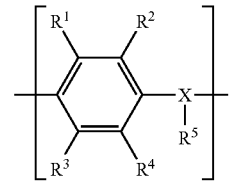

(2)

wherein R¹ to R⁴ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of R¹ and R², or R³ and R⁴ may combine with each other at an arbitrary position to form a divalent chain for forming at least one 3-, 4-, 5-, 6- or 7-membered saturated or unsaturated hydrocarbon cyclic structure together with the carbon atoms substituted by R¹ and R² or by R³ and R⁴; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

(12) The capacitor as described in 11 above, wherein the polymer is at least one selected from the group consisting of polypyrrole, polythiophene and substitution derivatives thereof.

(13) The capacitor as described in 12 above, wherein the polymer is an electrically conducting polymer containing a repeating unit represented by the following formula (3):

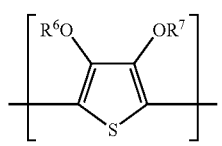

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

(14) The capacitor as described in 13 above, wherein the electrically conducting polymer is an electrically conducting polymer obtained by doping a dopant into poly(3,4-ethylenedioxythiophene).

DETAILED DESCRIPTION OF INVENTION

One practical embodiment for obtaining the sintered body of the present invention and a capacitor using the sintered body is described below.

The tantalum powder used as a starting material in the present invention can provide a sintered body usable as an electrode for capacitors and includes not only tantalum but also compositions comprising tantalum as a main component. Representative examples of such compositions include an alloy comprising tantalum as a main component. The main component means a component present in a proportion of more than 50%. The powder comprising tantalum as a main component can be produced from a generally available tantalum compound. For example, the tantalum powder can be obtained by the reduction of tantalum halide with magnesium or sodium, the reduction of potassium fluorotantalate with sodium, the molten salt (NaCl+KCl) electrolysis of potassium fluorotantalate on a nickel cathode, the reduction of tantalum pentoxide with alkali metal, alkaline earth metal, carbon or hydrogen, or the grinding/dehalogenation after the introduction of hydrogen into a tantalum ingot.

The obtained tantalum powder may be further processed. Examples of the processing method include a method of allowing the powder to stand in a vacuum at a high temperature of 500 to 2,000° C. and then wet- or dry-cracking the powder, a method of mixing the powder with an appropriate binder such as acrylic resin or polyvinyl alcohol and then cracking the powder, and a method of mixing the powder with an appropriate compound such as acrylic resin or camphor, allowing it to stand in a vacuum at a high temperature, and then wet- or dry-cracking the powder.

The final powder usually has a particle size of, in terms of an average particle size, from 10 to 300 μm. The average particle size can be freely adjusted, for example, by the classification after grinding or by the mixing of an appropriate amount of non-ground powder after grinding.

The tantalum powder may be partially nitrided. In order to produce a sintered body from the powder and form a dielectric material on the surface of the sintered body as described later to have a small LC value, the nitrided amount is preferably from 10 to 100,000 mass ppm, more preferably from 300 to 7,000 mass ppm. The nitrided amount as used herein is not nitrogen adsorbed to the powder but means a ratio of the amount of nitrogen reacted with tantalum to form a nitride, in the sintered body.

The nitridation of powder may be performed for the tantalum powder in any step described above and the nitridation may be performed by any one of liquid nitridation, ion nitridation and gas nitridation or by a combination thereof.

A gas nitridation treatment by a nitrogen gas atmosphere is preferred, because the apparatus is simple and the operation is easy. For example, the gas nitridation by a nitrogen gas atmosphere is achieved by allowing the powder to stand in a nitrogen atmosphere. With a nitridation atmosphere temperature of 2,000° C. or less and a standing time of several hours, a powder having an objective nitrided amount can be obtained. By performing the treatment at a high temperature, the treatment time can be shortened. The nitrided amount of the powder can be controlled by the conditions of nitridation temperature and nitridation time of the material to be nitrided, which are confirmed by a preliminary test or the like.

The sintered body of the present invention is produced by sintering the above-described powder. One example of the method for producing the sintered body is described below, however, the production method of the sintered body is not limited to this example.

The sintered body can be obtained, for example, by press-molding the powder into a predetermined shape and heating it at 500 to 2,000° C. under a pressure of $10^{-1}$ to $10^{-4}$ Pa for a few minutes to a few hours. The pressure at the press molding is set higher than the pressure capable of molding the powder and lower than the pressure of giving a sintered body having one pore diameter distribution peak. This pressure range varies depending on the conditions such as properties of powder and press-molding machine used, however, can be decided by a preliminary test.

When the compact obtained by such a method is sintered, for example, at 1,300° C., the sintered body has a CV value (a product of a chemical forming voltage and a 120 Hz capacitance when chemically formed at 80° C. for 120 minutes in an aqueous 0.1 mass % phosphoric acid solution) of 40,000 to 200,000 μFV/g.

The thus-obtained sintered body of the present invention has a pore diameter distribution having a plurality of peaks. Out of a plurality of peaks, two peaks having a largest relative intensity and a second largest relative intensity have a pore diameter of 0.2 to 0.7 μm and a pore diameter of 0.7 to 3 μm, preferably a pore diameter of 0.2 to 0.7 μm and a pore diameter of 0.9 to 3 μm. A capacitor produced from this sintered body can have good moisture resistance. Furthermore, out of these two peaks, the peak in the larger diameter side preferably has a larger relative intensity, because the capacitor can have higher moisture resistance. The relative intensity is a differential value of the cumulative pore volume.

The thus-produced sintered body of the present invention has a specific surface area of, for example, from 0.2 to 7 m²/g.

In general, as the shape of the sintered body is larger, the impregnation of the counter electrode becomes more difficult. Therefore, the sintered body of the present invention can be preferably applied to capacitors requiring a large sintered body and is particularly effective when the sintered body required has a size of 10 mm³ or more.

The sintered body of the present invention may be partially nitrided. The nitridation can be performed in the same manner as the method described above as method for nitriding the powder. The nitridation amount (concentration) of the sintered body is preferably at the same level with the nitridation amount of the powder.

It is also possible to partially nitride a tantalum powder for the production of a sintered body and further partially nitride the sintered body produced from the powder.

The sintered body of the present invention usually contains a natural oxidization oxygen contained in the tantalum powder and an oxygen added by the natural oxidation after sintering in an amount of 500 to 70,000 mass ppm. In the sintered body of the present invention, the content of elements except for tantalum, oxygen, nitrogen and an alloy-forming element with tantalum, is 400 mass ppm or less.

By preparing a lead wire having appropriate shape and length composed of a valve-acting metal such as niobium or tantalum at the manufacture of the sintered body of the present invention, the powder may be press-molded such that a part of the lead wire is inserted inside the compact and integrally molded to serve as an outgoing lead wire of the sintered body.

Using this sintered body for one part electrode, a capacitor can be produced by interposing a dielectric material between this one part electrode and the counter electrode. Examples of the dielectric material for the capacitor include dielectric materials comprising a tantalum oxide as a main component. For example, the dielectric material comprising a tantalum oxide as a main component can be obtained by chemically forming the tantalum sintered body as one part electrode in an electrolytic solution. For chemically forming the tantalum electrode in an electrolytic solution, an aqueous protonic acid solution is generally used, such as an aqueous 0.1% acetic acid solution or an aqueous sulfuric acid solution. In the case where a dielectric material comprising a tantalum oxide as a main component is obtained by chemically forming the tantalum electrode in an electrolytic solution, the capacitor of the present invention is an electrolytic capacitor and the tantalum sintered body side serves as an anode.

On the other hand, the counter electrode of the capacitor of the present invention is, for example, at least one compound selected from electrolytic solutions, organic semiconductors and inorganic semiconductors known in the art of aluminum electrolytic capacitor.

Specific examples of the electrolytic solution include a dimethylformamide-ethylene glycol mixed solution having dissolved therein 5 mass % of isobutyltripropylammonium borotetrafluoride electrolyte, and a propylene carbonate-ethylene glycol mixed solution having dissolved therein 7 mass % of tetraethylammonium borotetrafluoride.

Specific examples of the organic semiconductor include an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing a repeating unit represented by the following formula (1) or (2):

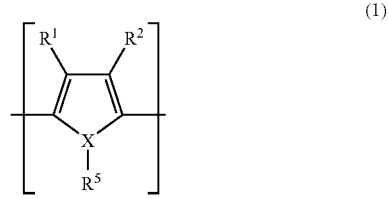

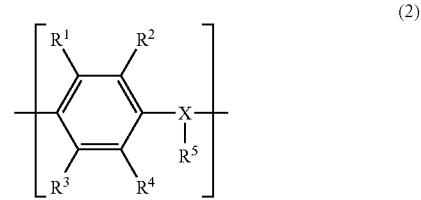

wherein $R^1$ to $R^4$ each independently represents a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

In the present invention, the electrically conducting polymer containing a repeating unit represented by formula (1) is preferably an electrically conducting polymer containing a structure unit represented by the following formula (3) as a repeating unit:

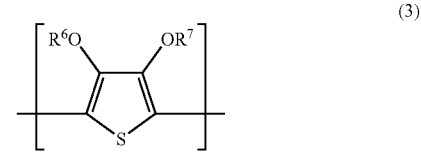

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

The electrically conducting polymer containing such a chemical structure bears electrical charge and is doped with a dopant. For the dopant, known dopants can be used without limitation.

Examples of the polymer containing a repeating unit represented by formula (1), (2) or (3) Include polyaniline, polyoxyphenylene, polyphenylene sulfide, polythiophene, polyfuran, polypyrrole, polymethylpyrrole and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include an inorganic semiconductor mainly comprising lead dioxide or manganese dioxide, and an inorganic semiconductor comprising tri-iron tetroxide. These semiconductors may be used individually or in combination of two or more thereof.

When the organic or inorganic semiconductor used has an electrical conductivity of $10^{-2}$ to $10^3$ S/cm, the capacitor produced can have a smaller impedance value and can be more increased in the capacitance at a high frequency.

In the case where the counter electrode is solid, an electrically conducting layer may be provided thereon so as to attain good electrical contact with an exterior outgoing lead (for example, lead frame).

The electrically conducting layer can be formed using, for example, solidification of an electrically conducting paste, plating, vapor deposition of metal or formation of a heat-resistant electrically conducting resin film. Preferred examples of the electrically conducting paste include silver paste, copper paste, aluminum paste, carbon paste and nickel paste. These pastes may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, a carbon paste and a silver paste are stacked in this order on the counter electrode and these are molded with a material such as epoxy resin, whereby a capacitor is fabricated. This capacitor may have a niobium or tantalum lead which is integrally sintered and molded with the sintered body or welded afterward.

The thus-fabricated capacitor of the present invention is jacketed using, for example, resin mold, resin case, metallic jacket case, dipping of resin or laminate film, and then used as a capacitor product for various uses.

When the counter electrode is a liquid, the capacitor fabricated from two electrodes and a dielectric material is housed in a can electrically connected to the counter electrode, thereby completing the capacitor. In this case, the electrode side of the sintered body is guided outside through the tantalum or niobium lead and at the same time, insulated from the can using an insulating rubber or the like.

BEST MODE FOR CARRYING OUT THE INVENTION

The present invention is described in greater detail below by referring to Examples, however, the present invention is not limited to the Examples.

The nitrogen and oxygen contents of the tantalum sintered body in the following examples were determined using a nitrogen-oxygen analyzer manufactured by LECO Corporation.

The pore size distribution of the sintered body was measured using Autopore 9200 manufactured by Shimadzu Corporation.

The capacitance of the capacitor was measured by LCR meter manufactured by Hewlett Packard Company.

The CV value of the sintered body was determined from the product of a chemical forming voltage 20 V and a capacitance measured in 30% sulfuric acid after the chemical forming was performed in an aqueous 0.1% acetic acid solution at 80° C. for 200 minutes while applying a voltage of 20 V.

The capacitance appearance ratio was expressed by a ratio of a capacitance in 30% sulfuric acid when the chemical forming was performed for 1,000 minutes under the above-described conditions, which is taken as 100%, to a capacitance after the fabrication of a capacitor.

The moisture resistance value of the capacitor is expressed by the number of units showing, when the capacitor was produced and left standing at 60° C. and 95% RH for 500 hours, a capacitance of less than 110% or less than 120% of the initial value. As the number of units showing a capacitance of less than 110% is larger, the moisture resistance was judged higher. The number of samples produced for determining the capacitance appearance ratio and the moisture resistance value was 30 units in each Example.

In the measurement of particle size, the particle size distribution was measured by a laser diffraction scattering method using HRA 9320-X100 manufactured by Microtrac Inc. The particle size (D50; μm) when the cumulative vol % corresponded to 50 vol % was designated as the average particle size.

EXAMPLES 1 to 6

A hydride of a tantalum ingot was ground and dehydrogenated to obtain primary particles having an average particle size of 0.7 μm. An operation of burning and then grinding the primary particles was repeated a plurality of times to obtain a granulated tantalum powder. Then, 0.15 g of the granulated powder was charged into a metal mold together with a separately prepared tantalum wire having a length of 10 mm and a size of 0.30 mm and pressed by applying a load(N) shown in Table 1 using a molding machine to obtain a compact having a size of 4.0×3.5×1.8 mm. Subsequently, the compacts each was sintered at 1,300° C. for 30 minutes to obtain a sintered body shown in Table 1.

The size, specific surface area and CV value of the sintered body of Example 1 were 23.7 mm$^3$, 0.8 m$^2$/g and 52,000 μLFV/g, respectively. In the other Examples, these values each was within ±3% of Example 1.

EXAMPLES 7 TO 9

Sintered bodies were obtained in the same manner as in Examples 1 to 3 except that the average particle size of the primary particles was adjusted to 0.5 μm by classifying the primary particles in Examples 1 to 3. The size, specific surface area and CV value of the sintered body of Example 7 were 24.9 mm$^3$, 1.1 m$^2$/g and 69,000 μFV/g, respectively. In other Examples and Comparative Examples, these values each was within ±1% of Example 7.

COMPARATIVE EXAMPLES 1 TO 3

Sintered bodies were produced in the same manner as in Examples 1 to 3 except that a tantalum powder obtained by reducing potassium fluorotantalate with sodium and heat-treating the resulting tantalum powder at 1,100° C. was used in place of the granulated tantalum powder used in Examples 1 to 3. The size, specific surface area and CV value of the sintered body of Comparative Example 1 were 24.3 mm$^3$, 0.8 m$^2$/g and 53,000 μV/g, respectively. In other Comparative Examples, these values each was within ±2% of Comparative Example 1. The pore diameter distribution of each sintered body produced is shown in Table 1.

TABLE 1

| Example and Comparative Example | Molding Load, N | Pore Diameter of Peak 1, μm | Pore Diameter of Peak 2, μm | Peak Having Larger Relative Intensity |
|---|---|---|---|---|
| Example 1 | 392 | 0.67 | 1 | 2 |
| Example 2 | 686 | 0.4 | 1.4 | 2 |
| Example 3 | 981 | 0.27 | 0.78 | 2 |
| Example 4 | 490 | 0.35 | 2.2 | 2 |
| Example 5 | 785 | 0.49 | 0.95 | 2 |
| Example 6 | 294 | 0.61 | 2.8 | 2 |
| Example 7 | 392 | 0.52 | 2.2 | 2 |
| Example 8 | 686 | 0.44 | 2.8 | 2 |
| Example 9 | 981 | 0.35 | 1.2 | 1 |
| Comparative Example 1 | 490 | 0.62 | none | — |
| Comparative Example 2 | 686 | 0.55 | none | — |
| Comparative Example 3 | 392 | 0.82 | none | — |

60 Units of each sintered body produced in the same manner as those of Examples 1 to 9 and Comparative Examples 1 to 3 each was chemically formed at 80° C. for 1,000 minutes while applying 20 V in an aqueous 0.1% phosphoric acid solution to form an oxide dielectric film layer on the surface of the sintered body. The chemically formed sintered bodies were divided into groups each consisting of 30 units and two kinds of cathode agents A and B shown in Table 2 were impregnated into 30 units of respective groups. Thereafter, a carbon paste and a silver paste were stacked in this order and the device as a whole was molded with an epoxy resin to manufacture a chip-type capacitor. The capacitance appearance ratio and the moisture resistance value of each capacitor manufactured are shown in Table 3.

TABLE 2

| Method | Cathode Agent | Method of Impregnating Cathode Agent |
|---|---|---|
| A | Polypyrrole | A sintered body attached with ammonium persulfate and anthraquinonesulfonic acid was repeatedly subjected to vapor phase polymerization with pyrrole vapor. |
| B | A mixture of lead dioxide and lead sulfate (lead dioxide: 98 mass %) | A sintered body was repeatedly dipped in a mixed solution of lead acetate and ammonium persulfate. |

TABLE 3

| | | | Moisture Resistance Value | |
|---|---|---|---|---|
| | Method of Impregnating Cathode Agent | Capacitance Appearance Ratio, % | Number of Units Having Capacitance of 100-110% | Number of Units Having Capacitance of 110-120% |
| Example 1 | A | 82 | 30/30 | 0/30 |
| | B | 88 | 30/30 | 0/30 |
| Example 2 | A | 85 | 30/30 | 0/30 |
| | B | 87 | 30/30 | 0/30 |
| Example 3 | A | 79 | 27/30 | 3/30 |
| Example 4 | A | 84 | 30/30 | 0/30 |
| Example 5 | A | 80 | 30/30 | 0/30 |
| Example 6 | A | 82 | 30/30 | 0/30 |
| Example 7 | A | 85 | 30/30 | 0/30 |
| Example 8 | A | 81 | 30/30 | 0/30 |
| Example 9 | A | 82 | 30/30 | 0/30 |
| Comparative Example 1 | A | 71 | 16/30 | 14/30 |
| Comparative Example 2 | A | 69 | 11/30 | 19/30 |
| Comparative Example 3 | A | 73 | 17/30 | 13/30 |

On comparison between Table 1 and Table 3, it is seen that the tantalum sintered body of the present invention has a plurality of peaks in the pore size distribution and therefore, a capacitor having a large capacitance appearance ratio and good moisture resistance property can be manufactured.

INDUSTRIAL APPLICABILITY

When a tantalum sintered body of the present invention having a plurality of peaks in the pore size distribution, particularly a tantalum sintered body where out of a plurality of peaks, two peaks having a largest relative intensity and a second largest relative intensity have a pore diameter of 0.2 to 0.7 μm and a pore diameter of 0.7 to 3 μm, is used, a capacitor having a large capacitance appearance ratio and good humidity resistance property can be manufactured.

The invention claimed is:

1. A capacitor, comprising a tantalum sintered body comprising a pore size distribution having a plurality of peaks, a dielectric material formed on the surface of the sintered body, and a counter electrode provided on the dielectric material, wherein out of a plurality of peaks, two peaks having a largest relative intensity and a second largest relative intensity have a pore diameter of 0.2 to 0.7 μm and a pore diameter of 0.7 to 3 μm and wherein out of a plurality of peaks, the peak having a largest relative intensity has a pore diameter of 0.7 to 3 μm.

2. A capacitor, comprising a tantalum sintered body comprising a pore size distribution having a plurality of peaks, a dielectric material formed on the surface of the sintered body, and a counter electrode provided on the dielectric material, wherein out of a plurality of peaks, two peaks having a largest relative intensity and a second largest relative intensity have a pore diameter of 0.2 to 0.7 μm and a pore diameter of 0.7 to 3 μm and wherein the sintered body has a specific area of 0.2 to 7 m$^2$/g.

3. The capacitor as claimed in claim 1, wherein a part of the sintered body is nitrided.

4. The capacitor as claimed in claim 1, wherein the sintered body is obtained from a tantalum powder compact of giving a sintered body having a CV value of 40,000 to 200,000 μFV/g when sintered at 1,300° C.

5. The capacitor as claimed in claim 1, wherein the dielectric material comprises a tantalum oxide as a main component.

6. The capacitor as claimed in claim 5, wherein the tantalum oxide is formed by electrolytic oxidation.

7. A capacitor, comprising a tantalum sintered body comprising a pore size distribution having a plurality of peaks, a dielectric material formed on the surface of the sintered body, and a counter electrode provided on the dielectric material, wherein out of a plurality of peaks, two peaks having a largest relative intensity and a second largest relative intensity have a pore diameter of 0.2 to 0.7 µm and a pore diameter of 0.7 to 3 µm and wherein the counter electrode is an electrically conducting polymer obtained by doping a dopant into a polymer containing a repeating unit represented by the following formula (1) or (2):

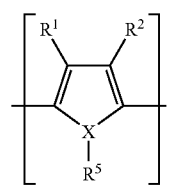

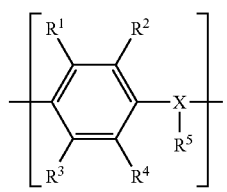

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

8. The capacitor as claimed in claim 7, wherein the polymer is at least one selected from the group consisting of polypyrrole, polythiophene and substitution derivatives thereof.

9. The capacitor as claimed in claim 8, wherein the polymer is polythiophene derivative containing a repeating unit represented by the following formula (3):

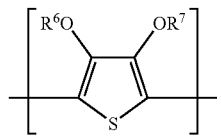

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

10. The capacitor as claimed in claim 9, wherein the polythiophene derivative is poly(3,4-ethylenedioxythiophene).

11. A tantalum sintered body, comprising a pore size distribution having a plurality of peaks, wherein out of a plurality of peaks, two peaks having a largest relative intensity and a second largest relative intensity have a pore diameter of 0.2 to 0.7 µm and a pore diameter of 0.7 to 3 µm wherein out of a plurality of peaks, the peak having a largest relative intensity has a pore diameter of 0.7 to 3 µm.

12. A tantalum sintered body, comprising a pore size distribution having a plurality of peaks, wherein out of a plurality of peaks, two peaks having a largest relative intensity and a second largest relative intensity have a pore diameter of 0.2 to 0.7 µm and pore diameter of 0.7 to 3 µm wherein the sintered body has a specific area of 0.2 to 7 $m^2/g$.

13. The tantalum sintered body as claimed in claim 11, wherein a part of the sintered body is nitrided.

14. The tantalum sintered body as claimed in claim 11, wherein the sintered body is obtained from a tantalum powder compact of giving a sintered body having a CV value of 40,000 to 200,000 µFV/g when sintered at 1,300° C.

15. A capacitor comprising the sintered body described in claim 11 as an electrode, a dielectric material formed on the surface of the sintered body, and a counter electrode provided on the dielectric material.

16. The capacitor as claimed in claim 15, wherein the dielectric material comprises a tantalum oxide as a main component.

17. The capacitor as claimed in claim 16, wherein the tantalum oxide is formed by electrolytic oxidation.

18. The capacitor as claimed in claim 15, wherein the counter electrode is an electrically conducting polymer obtained by doping a dopant into a polymer containing a repeating unit represented by the following formula (1) or (2):

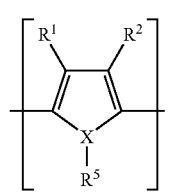

-continued

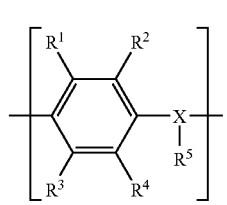
(2)

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

19. The capacitor as claimed in claim 18, wherein the polymer is at least one selected from the group consisting of polypyrrole, polythiophene and substitution derivatives thereof.

20. The capacitor as claimed in claim 19, wherein the polymer is a polythiophene derivative containing a repeating unit represented by the following formula (3):

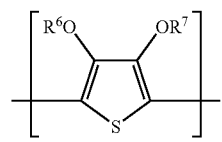
(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic-structure includes a structure having a vinylene bond which may be substituted, and a phenylene structure which may be substituted.

21. The capacitor as claimed in claim 20, wherein the polythiophene derivative is poly(3,4-ethylenedioxythiophene).

22. The capacitor as claimed in claim 1, wherein the sintered body has a volume of 10 mm³ or more including the volume of pore voids.

23. The tantalum sintered body as claimed in claim 11, wherein the sintered body has a volume of 10 mm³ or more including the volume of pore voids.

24. The capacitor as claimed in claim 2, wherein a part of the sintered body is nitrided.

25. The capacitor as claimed in claim 2, wherein the sintered body is obtained from a tantalum powder compact of giving a sintered body having a CV value of 40,000 to 200,000 μFV/g when sintered at 1,300° C.

26. The capacitor as claimed in claim 2, wherein the dielectric material comprises a tantalum oxide as a main component.

27. The capacitor as claimed in claim 2, wherein the sintered body has a volume of 10 mm³ or more including the volume of pore voids.

28. The capacitor as claimed in claim 7, wherein a part of the sintered body is nitrided.

29. The capacitor as claimed in claim 7, wherein the sintered body is obtained from a tantalum powder compact of giving a sintered body having a CV value of 40,000 to 200,000 μFV/g when sintered at 1,300° C.

30. The capacitor as claimed in claim 7, wherein the dielectric material comprises a tantalum oxide as a main component.

31. The capacitor as claimed in claim 7, wherein the sintered body has a volume of 10 mm³ or more including the volume of pore voids.

32. The tantalum sintered body as claimed in claim 12, wherein a part of the sintered body is nitrided.

33. The tantalum sintered body as claimed in claim 12, wherein the sintered body is obtained from a tantalum powder compact of giving a sintered body having a CV value of 40,000 to 200,000 μFV/g when sintered at 1,300° C.

34. A capacitor comprising the sintered body described in claim 12, as an electrode, a dielectric material formed on the surface of the sintered body, and a counter electrode provided on the dielectric material.

35. The tantalum sintered body as claimed in claim 12, wherein the sintered body has a volume of 10 mm³ or more including the volume of pore voids.

* * * * *